Feb. 3, 1959  A. W. VIBBER  2,871,648
TWISTING SPINDLE BALLOON CONTROL
Filed Nov. 4, 1957  4 Sheets-Sheet 1

INVENTOR
Alfred W. Vibber

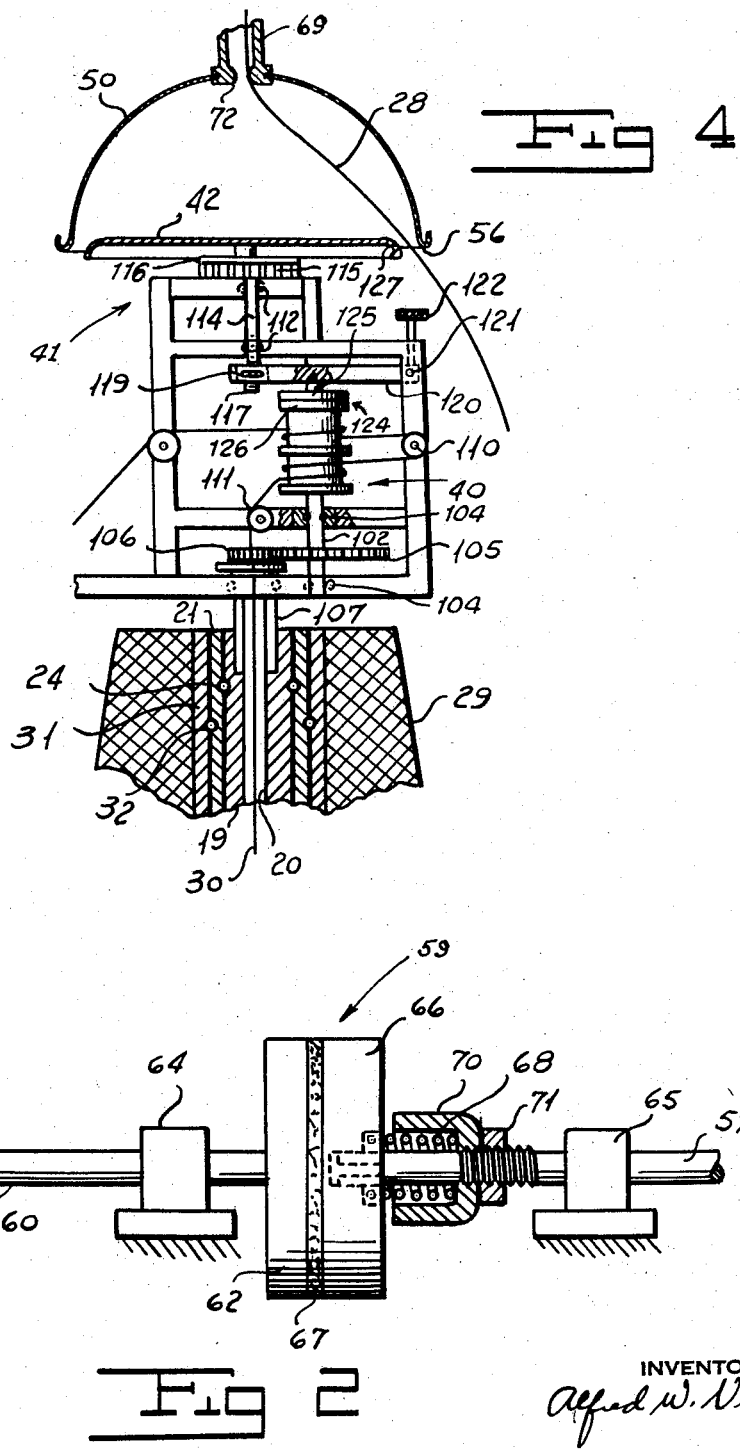

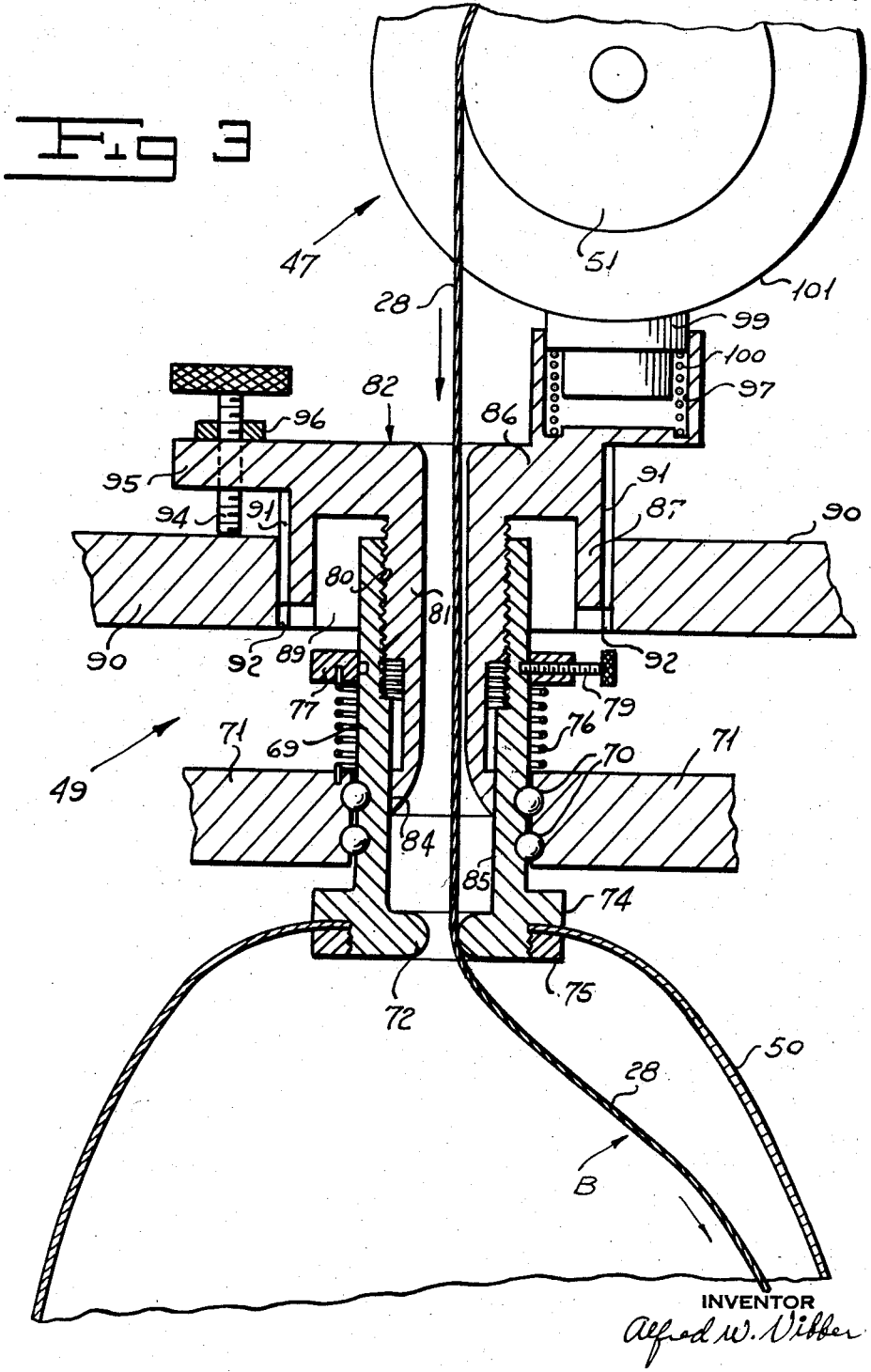

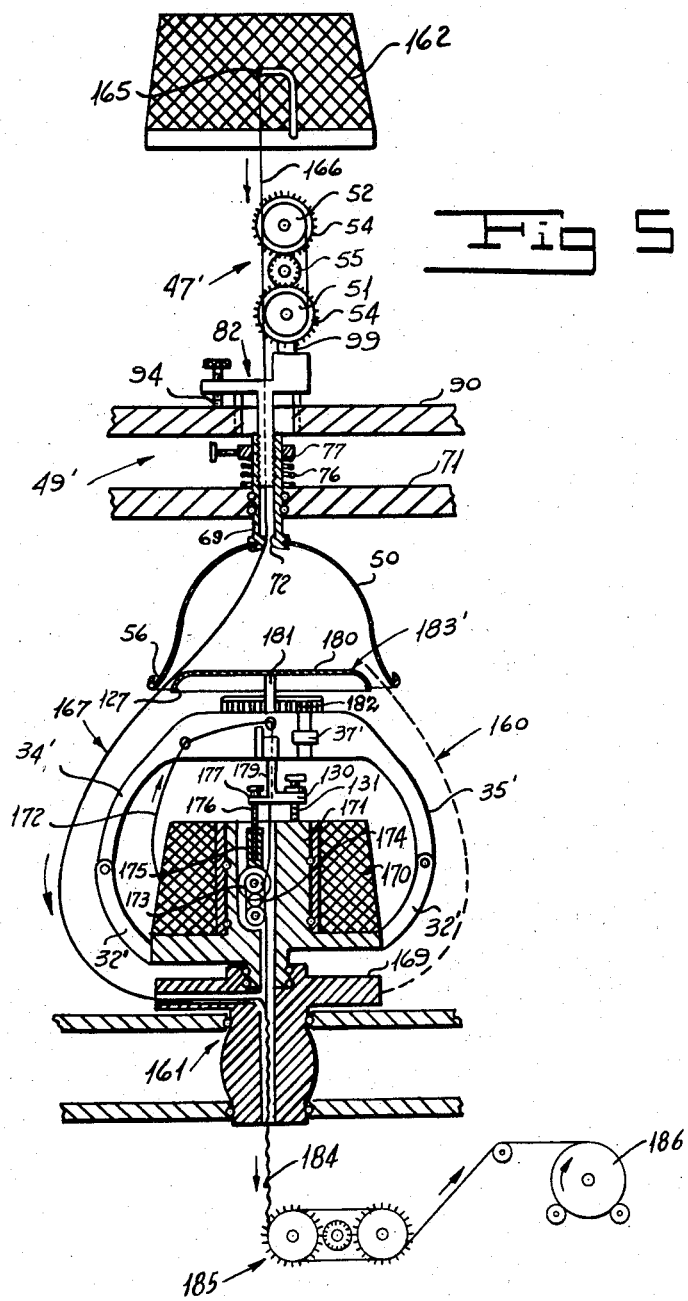

United States Patent Office 2,871,648
Patented Feb. 3, 1959

2,871,648

TWISTING SPINDLE BALLOON CONTROL

Alfred W. Vibber, Ridgewood, N. J.

Application November 4, 1957, Serial No. 695,477

25 Claims. (Cl. 57—58.36)

This invention relates to apparatus for controlling the size and shape of a rotating bulging loop, or balloon, of elongated flexible material such as occurs at a twisting and/or plying spindle.

This application is a continuation-in-part of application Serial No. 573,533, filed March 23, 1956, now abandoned.

With any twisting spindle employing a free flying balloon the size of the balloon is of importance. With such spindles, the diameter of the balloon cannot exceed a certain dimension because of the economy of space required. Further, as is well known, the diameter of a balloon has a vital bearing on the tension at which the material is twisted. When a twisting spindle feeds directly into, or is fed from, another spindle or spindles, the control of the tension of the material at such first spindle and thus the control of the size of the balloon of that spindle within certain limits, becomes especially important.

With plying spindles, particularly of the type wherein one strand balloons about the source of another strand and the two strands are then plied together, accurate control of the size of the balloon is necessary, since balloon size has a direct bearing upon the relative tensions of the two strands in the runs thereof immediately approaching the plying point. Ordinarily, as in the making of cord for the reinforcing of tires and V-belts by this method, equal lengths of the two strands are desired in the finished plied strand. Thus it is important that the two strands, the one ballooned and the other not, shall be and remain under substantially the same tension as they approach the plying point.

The prior devices, disclosed in applicant's prior applications Ser. No. 261,704, filed December 14, 1951; Ser. No. 317,406, filed October 29, 1952, now Patent No. 2,851,848; and Ser. No. 541,222, filed October 18, 1955, now abandoned, are satisfactory and work well. All, however, constantly engage the balloon by a member which is responsive to changes in balloon diameter, and control therefrom a variable strand-tensioning means so as to counteract and correct any changes in the size and shape of the balloon. The constant frictional contact between the balloon and the member responsive to changes in balloon diameter may, in time, cause undue wear on the member so as to necessitate its replacement.

The apparatus of the present invention is such that under normal operating conditions the balloon travels freely in space without contacting any member between the apex guide for the balloon and the balloon generating means such as a flyer or traveller. The apparatus of the invention includes means outside the balloon and preferably operated thereby only when the balloon reaches a predetermined first, larger diameter, means inside the balloon and preferably operated thereby only when the balloon reaches a predetermined second, smaller diameter, and means responsive to the inner and outer means operated by the balloon for controlling the size of the balloon to maintain its diameter within predetermined desired limits.

In the embodiments of the apparatus shown, the inner and outer means operated by the balloon are contacted by the balloon when the latter reaches the said second and first predetermined diameters, respectively, the balloon flying freely between such inner and outer means without contacting either when its diameter lies in the range between said first and second predetermined diameters.

Although the two embodiments of the apparatus shown are "skip type" plying spindles, it will be obvious that the invention may be applied to advantage in spindles of other types, such as, to give but one example, uptwisters of the two-for-one type.

The invention has among its objects the provision of improved apparatus for detecting changes in the size or shape of a balloon or rotating bulging loop in a strand.

A further object of the invention, in certain embodiments thereof, lies in the provision, in apparatus of the type indicated, of an improved combination of balloon or loop size detecting means, located inwardly of the balloon or loop, and strand-tensioning means operated thereby.

Yet another object of the invention, in certain embodiments thereof, lies in the provision, in apparatus of the type indicated, of an improved combination of balloon or loop size detecting means, located outwardly of the balloon or loop, and strand-tensioning means operated thereby.

Still a further object of the invention lies in the provision of a novel combination of means located inwardly of the balloon or loop and operative to detect a decrease of balloon or loop diameter to a smaller predetermined value, means located outwardly of the balloon or loop and operative to detect an increase of balloon or loop diameter to a larger predetermined value, and mechanism responsive to the means detecting such decrease and increase of balloon diameter for maintaining the diameter of the balloon within predetermined limits.

A further object of the invention is the provision, in apparatus of the type indicated in the preceding paragraph, of balloon or loop size detecting means which are selectively contacted by the balloon only when the balloon reaches the respective predetermined diameters.

A still further object of the invention resides in the provision of improved strand-tensioning mechanism, in preferred embodiments such mechanism subjecting the strand engaged thereby selectively to either a first, substantially constant tension or a controlled variable tension.

The above and further objects of the invention including economies and advantages of manufacture and operation will be more apparent upon consideration of preferred embodiments of apparatus in accordance with the invention as shown in the accompanying drawings, in which:

Fig. 2 is an enlarged fragmentary view in vertical axial section through a slip clutch which is interposed in the driving train for the capstan forwarding the outer strand to the balloon.

Fig. 3 is an enlarged fragmentary view in vertical section of the portion of the apparatus which is located generally above the balloon and which, in response to the balloon when the latter become too large in diameter, feeds the outer strand into the balloon more slowly.

Fig. 4 is an enlarged fragmentary view of the top of the spindle of Fig. 1, the figure showing the variable speed capstan means, and the mechanism governing such means, for forwarding the second strand to the plying junction, certain parts of the apparatus being shown in section and others being shown in elevation.

Fig. 5 is a somewhat diagrammatic view of a second embodiment of the apparatus of the invention, certain parts of the apparatus being shown in vertical, generally axial, section, and other parts thereof being shown in elevation.

Figure 1:
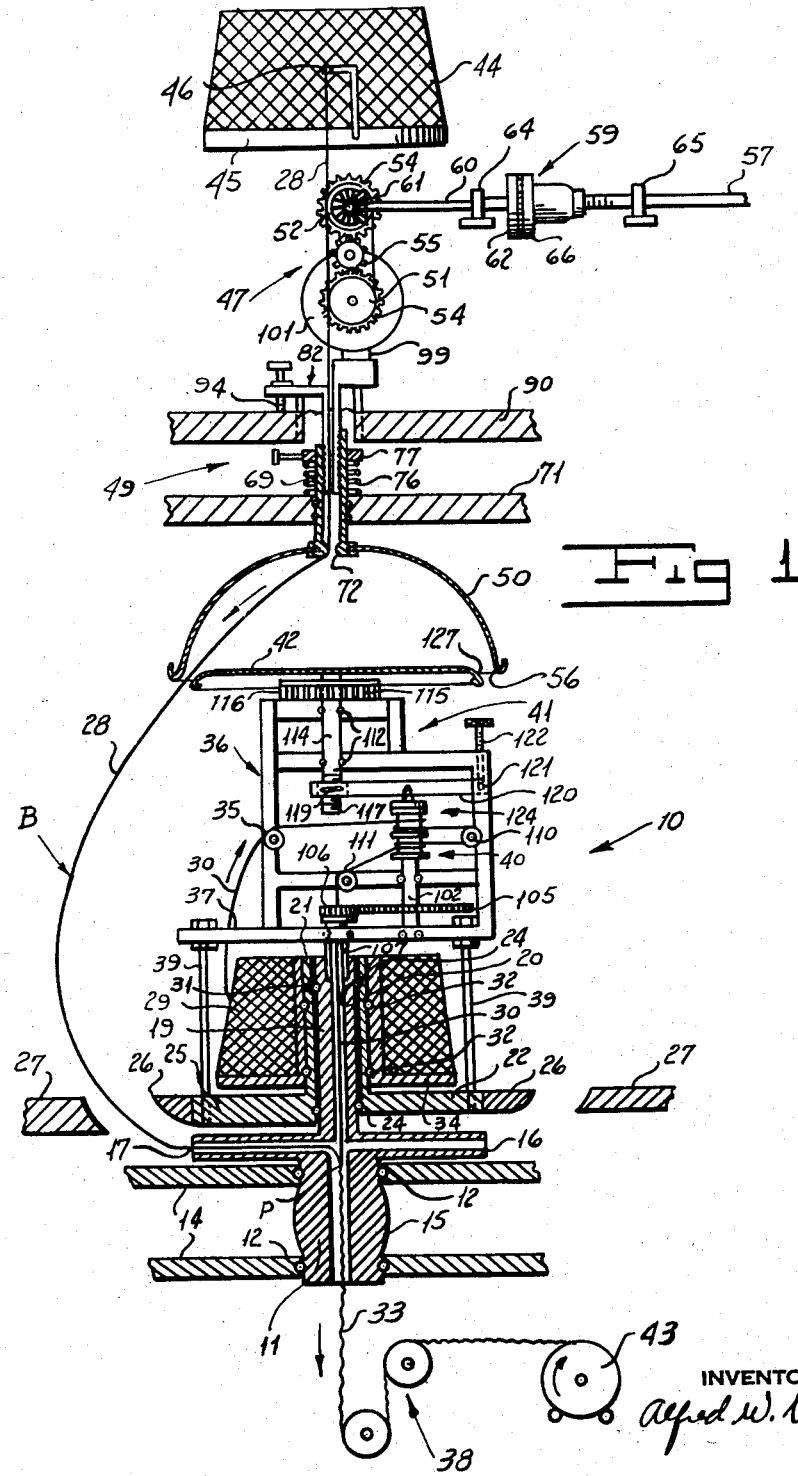
Fig. 1 is a somewhat diagrammatic view of a first embodiment of the apparatus of the invention, certain parts of the apparatus being shown in vertical, generally axial, section, and other parts thereof being shown in elevation.

As is evident from the above, there are shown herein two embodiments of yarn twisting and/or plying spindles in accordance with the invention. The first such embodiment is shown in Figs. 1–4, inclusive; the second is shown in Fig. 5. Both embodiments employ a twisting and plying spindle generally of the type disclosed and claimed in Fig. 8 of applicant's prior application Serial No. 541,222, filed October 18, 1955.

The spindle of the first disclosed embodiment is characterized by the use of a first and a second substantially positive means for forwarding the first and second strands, respectively, to the plying junction, both said means being driven at constant speed when the balloon diameter lies intermediate the termini of the desired balloon diameter range. When the balloon expands to the outer terminus of such range, the first strand feeding means is slowed, thereby to reduce the rate of feeding of the first strand into the balloon, the speed of the second feeding means at this time remaining constant. When the balloon contracts to the inner terminus of such range, the second strand feeding means is at least partially freed from its driving means, whereby it may be impelled faster than such driving means by the second strand running over the second feeding means, the speed of the first strand feeding means at this time remaining constant.

When the tension in the first, outer strand 28 exceeds that of the second strand 30 (Figs. 1–4), in the runs thereof approaching the plying junction P, as when the balloon is too large, the first strand tends to become the core of the plied strand 33, less of the first than of the second strand being absorbed into the plied strand. The reverse is true when the balloon of the first strand becomes too small. The mechanism of the invention, in both embodiments thereof, automatically adjusts the appropriate one of the strand feeding means, when the balloon reaches either of its operative termini, so as to tend to restore the balloon diameter to a mid point in its operating range, and thus to restore the tensions in the runs of the first and second strands approaching the plying junction to substantial equality.

In the embodiments of the apparatus shown, after being plied at point P, the strands 28 and 30, united in plied strand 33 are led axially down through a central passage in the main shaft 11 of the spindle to a substantially constant tension imposing means 38, which may be of the type disclosed in Clarkson Patent No. 2,503,242, and is then taken up on driven bobbin 43.

The spindle of the first embodiment, shown in Figs. 1, 2 and 3, is designated as a whole by the character 10. The spindle has a main shaft 11 journalled in ball bearings 12 mounted in the frame parts 14, and is driven by a belt (not shown) which runs over the crowned pulley 15. Shaft 11 has mounted thereon a disc-like flyer 16 which has a radial, strand-conducting passage 17 therein. Above the flyer the shaft 11 is provided with a smaller diametered portion 19 having an axial passage 20 therein communicating with the radial passage 17. A vertical sleeve member 21, having a horizontally extending platform member 22 at the bottom thereof, is journalled on the shaft portion 19 by ball bearings 24. Although the shaft 11 and the parts 19 and 21 have been described as vertical, it will be understood that the spindle as a whole is disposed at an appreciable angle to the vertical, so that the sleeve 21 is held substantially from rotation by the provision of a heavier section 25 on the platform 22. Additionally, or as an alternative, platform 22 may be held from rotation by the interaction of an annular magnet 26, disposed on the edge of platform 22, and an outer annular magneto 27, fixedly mounted on means not shown, and spaced therefrom so as to provide an annular open zone through which the lower end of the balloon B of outer strand 28 may rotate. An inner yarn package 29, providing a yarn strand 30, is mounted on a sleeve 31 rotatably mounted on sleeve 21 by ball bearings 32. Sleeve 31, which has a package-supporting platform 34 on the lower end thereof, may thus rotate as required by the paying off of strand 30 from package 29 and the leading of such strand to guide pulley 35 on framework 36, to be described, which is mounted on platform 22.

Framework 36 has a base plate 37 supported above package 29 by rods 39 projecting upwardly from the edge of platform 22, as shown. The framework, including plate 37, is removable from the top of rods 39, so as to allow the loading of fresh packages 29 on the spindle when necessary. Framework 36 forms the support for a capstan, generally designated 40, which governs the speed of forwarding of strand 30 to plying point or junction P, and for means, generally designated 41, for controlling such capstan, including circular disc 42 mounted within the balloon B and contacted thereby when the balloon contracts to the smaller treminus of the range of desired balloon diameter.

Strand 28 is fed from outer strand package 44, supported on a fixed means 45 so as to rotate as required by the feeding of the strand from the package through a fixed guiding eye 46. Strand 28, which in the disclosed embodiment of the apparatus is substantially identical with strand 30, is substantially non-slippingly engaged by a capstan, generally designated 47, the speed of which is constant when balloon B lies intermediate the termini of its desired operating range or when the balloon contacts disc 42. A capstan controlling means, generally designated 49, has an outer balloon-contacting bell means 50, having a lower inner rim 56, connected thereto, means 49 and 50 being so constructed and arranged that when the balloon B expands to the outer terminus of its operative range the speed of capstan 47 is reduced, thereby to reduce the speed of forwarding strand 28 into balloon B.

Proceeding now to detailed description of means 47, 49, and 50, the capstan 47 has two opposed multi-grooved rolls 51 and 52, the rolls being intergeared by pinions 54 on the rolls and the intermediate gear member 55. The capstan is fixedly mounted in space on portions of the machine framework, not shown. When balloon B does not contact bell 50, rolls 51 and 52 of capstan 47 are driven at a constant speed in the strand forwarding direction by shaft 57, which is driven at a constant speed, synchronized with the speed of main spindle shaft 11, by means not shown. Shaft 57 has serially connected therewith a clutch 59, to be described, and a stub shaft 60 connected to roll 52 by a bevel gear set 61.

Clutch 59 is shown in detail in Fig. 2. Such clutch has a first, driven plate 62 fixedly connected to stub shaft 60, which is rotatably held against endwise movement by pillow block 64. Shaft 57 is likewise rotatably mounted and held against endwise movement by pillow block 65. A second, driving clutch plate 66, having a suitable facing 67 of frictional material thereon, is splined to the end of shaft 57 so as to be able to move at least slightly toward and away from plate 62, which it confronts. The plate 66 is resiliently thrust into engagement with plate 62 by a spring 68 acting between a first cup-like nut 70 screwed on shaft 57 and the outer face of plate 66. The force with which plates 62 and 66 engage each other, and thus the maximum torque which clutch 59 can transmit before it slips, can be adjusted by screwing nut 70 toward or away from plate 66. A lock nut 71 retains nut 70 in adjusted position.

The clutch 59 is adjusted so that the torque which it transmits without slippage exceeds that exerted on strand 28 by capstan 47, and vice versa, during operation of the apparatus, but so that the clutch will slip, without imposing undue strain on the capstan or its driving means, when the capstan is braked by means controlled by mechanisms 49 and 50. Such mechanisms, as briefly alluded to above, are brought into play only when balloon B forcibly contacts bell 50. When the capstan is thus braked, its speed falls below that of shaft 57, which continues to be driven at constant speed, so that strand 28 is then fed into the balloon at a reduced rate. When the balloon no longer contacts bell 50 with appreciable force, clutch 59 ceases to slip, and shaft 57 again drives capstan 47 at constant speed.

The construction of mechanism 49, its connection to bell 50, and the manner of interaction between mechanism 49 and capstan 47 are illustrated in Fig. 3. As there shown, a hollow spindle disposed coaxially of and a fixed distance from shaft 11 is rotatably mounted on ball bearings 70 in an upper fixed frame part fragmentarily shown at 71. Spindle 69 carries at its lower end inwardly thereof a central guiding eye 72 for the free end of the balloon. The lower end of spindle 69 also serves as the support for bell 50. The upper end of the bell is provided with a central hole which receives the lower externally threaded end of the spindle, as shown. The bell is clamped on the spindle, so as to be non-rotatable with respect thereto, by having its central upper portion gripped between an outwardly directed flange 74 on the spindle and a nut 75 screwed onto the spindle.

The spindle 69, and thus the bell 50, are yieldingly turned in the direction opposite from the direction of rotation of balloon B by a coil spring 76 disposed around spindle 69 above frame part 71. One end of spring 76 is secured to frame part 71, and the other end is secured to a collar 77 adjustably held in a selected position around the axis of spindle 69 by thumb screw 79. By loosening the thumb screw and turning collar 77 around the spindle the spring 76 may be wound to impose a desired initial torque on the spindle.

The upper end of spindle 69 is internally threaded at 80. An inner sleeve portion 81 of a brake-applying member 82 is externally threaded, and mates with threads 80 on spindle 69. The lower end of sleeve 81 has an external cylindrical zone 84 which slidingly engages inner cylindrical surface 85 of spindle 69, so as to aid in guiding sleeve 81. Sleeve 81 has a central axial bore which receives strand 28 therethrough in its passage downwardly from lower roll 51 of capstan 47 to the guide 72.

Sleeve 81 has integral therewith an upper outwardly directed flange 86 which carries a downwardly directed short outer sleeve 87 which surrounds and is spaced radially outwardly from the upper end of spindle 69. The outer surface of sleeve 87 is vertically slidingly received in bore 89 in an upper fixed frame part 90, which is located spaced above frame part 71. Sleeves 87 and 81 are prevented from rotation by the engagement of splines 91 on sleeve 87 with grooves 92 in the sidewall of bore 89. The threads on spindle 69 and sleeve 81 are made of such hand that spindle 69 is turned in the direction of rotation of the balloon B by engagement of bell 50 by the balloon, the member 82 rises, and when spring 76 turns the spindle in the reverse direction the member 82 descends. Descent of member 82 is stopped by engagement of an adjustable stop stud 94 threaded into an arm 95 on member 82. Stud 94, the lower end of which engages frame part 90 when member 82 descends, is held in adjusted position by lock nut 96. When the balloon B, after having engaged the rim 56 of bell 50 with sufficient force to rotate the spindle 69 to raise member 82, gradually contracts as a result of the action of member 82, spring 76 turns spindle 69 in the reverse direction, causing member 82 to descend to the position determined by stop 94. Thereafter, spindle 69 remains non-rotating so long as the balloon does not contact bell 50.

Member 86 carries on its upper end an upwardly open vertical walled cavity 97 carrying a brake shoe 99 vertically reciprocable therein. The brake shoe is urged upwardly in the cavity by a relatively stiff coil compression spring 100 acting between a shoulder on the brake shoe and the bottom of the cavity. Brake shoe 99 engages a brake drum 101 affixed to the shaft carrying roll 51 of capstan 47. The parts of mechanism 49, including brake shoe 99, spring 100, and brake drum 101 are so dimensioned that when member 82 has descended to its lower position, as shown in Fig. 3, the brake shoe 99 is either pulled free from brake drum 101 or does not engage it forcibly enough to cause clutch 59 to slip. When the balloon engages bell 50 forcibly enough, it first overcomes the opposition of spring 76 so as to cause member 82 to rise. Continued raising of member 82 causes the force between brake shoe 99 and brake drum 101 to increase until the capstan 47 is retarded sufficiently to cause clutch 59 increasingly to slip, thereby decreasing the speed of capstan 47 and causing strand 28 to be fed more slowly into the balloon. Thereupon the diameter of the balloon decreases so that the balloon eventually ceases to contact bell 50 so strongly, spindle 69 turns in a direction opposite the direction of rotation of the balloon, member 82 descends, and capstan 47 again resumes its constant speed of rotation as clutch 59 ceases to slip.

The mechanism 41 for correcting the condition of undue contraction of the balloon is shown in detail in Fig. 4. Such mechanism resembles somewhat that shown in Fig. 5 of application Ser. No. 541,222, wherein it is employed as to control the take-up capstan of a downtwister. In the present apparatus, the mechanism permits the increase in the rate of forwarding of the inner strand 30 to plying point P when the balloon contracts unduly.

Vertically disposed on frame 36 and rotatable in ball bearings 104 is a shaft 102 on which an inner capstan 40 is mounted. Capstan 40 substantially non-slippingly engages strand 30, in a manner to be described. Shaft 102 has keyed thereto a large gear 105 which meshes with a pinion 106 on the upper end of hollow stub shaft 107 which is rotatably mounted in plate 37 and is splined to the upper end of portion 19 of the main spindle shaft so as to be driven thereby. As shown, strand 30 is drawn off package 29 by capstan 40 so as to run over guide pulley 35. The strand then runs one or more times around the upper portion of capstan 40, then runs over transfer pulley 110, back around the lower portion of capstan 40, and then over guide gulley 111 and down through stub shaft 107 and portion 19 of the main spindle shaft to plying print P. Capstan 40 is driven at a constant speed when balloon B does not contact disc 42, the surface speed of capstan 40 when thus driven at constant speed being equal to the effective surface speed of capstan 47 at which it is driven when clutch 59 does not slip. Capstan 40 is under the control of the above referred to balloon contacting disc 42, which allows the capstan to be at least partially freed from shaft 102 when the balloon contracts unduly.

Bearing 112, mounted in horizontal members of framework 36 coaxially of spindle shaft 11, rotatably mount a shaft 114, on the top of which is secured the circular disc 42. Rotation of the disc 42 in the direction of rotation of the ballon B is opposed by a coil spring 115 located in spring barrel 116 which is fixedly mounted on the framework 36. One end of the spring 115 is secured to shaft 114, and the other end is secured to the spring barrel. Shaft 114 has a screw thread 117 on its lower end, such screw thread being engaged with a pivotally and slidably mounted nut 119 on the free end of a lever arm 120. The opposite end of the lever 120 is pivotally connected at 121 to the lower end of a vertical adjusting stud 122 threaded into a bore in framework 36.

As indicated above, capstan 40 is freely rotatably mounted on shaft 102 by bearings 104. The capstan is drivingly connected to shaft 102 by means of clutch 124. Clutch 124 has a driven upper movable plate element 125 which is pressed downwardly by an intermediate portion of lever 120. As the lever 120 presses the plate 125 downwardly against a friction disc 126 affixed to the upper end of capstan 40, the driving connection between shaft 102 and capstan 40 is progressively tightened. The upper end of shaft 102 is squared, as shown, and fits within a central square socket in the underside of plate 125, so that the plate may reciprocate vertically to a limited extent while preserving its driving connection with shaft 102.

The hands of the screw 117 and of the nut 119 are such that when rim 127 of the disc 42 is contacted by balloon B with sufficient force to rotate the disc in the direction of rotation of the balloon the lever arm 120 rises to loosen the clutch 124, and that when the disc 42 is driven in the reverse direction by the coil spring 115, the lever arm 120 travels downwardly to tighten the clutch. The coil spring 115, screw thread 117, nut 119, and lever arm 120 are such dimensions and properties, and pivot point 121 of the lever arm is so adjusted that when balloon B does not contact disc 42 clutch 124 is urged by spring 115 into non-slipping driving engagement. When the plates of clutch 124 are thus firmly thrust together they function as a stop for shaft 114 and disc 42, holding them from further rotation by spring 115 in the direction opposite from that of the balloon.

Thus the capstan 40 is driven at constant speed, synchronized with the rotation of spindle shaft 11, when the strand 28 in balloon contacts bell 50 or lies between rims 56 and 127 of bell 50 and disc 42, respectively. When the balloon contracts sufficiently for strand 28 therein to contact rim 127 of disc 42 with sufficient force to overcome the opposition of spring 115, clutch 124 is loosened, so that capstan 40 is at least partially freed from driving shaft 102. When the balloon B has thus contracted, the tension in the run of strand 30 approaching the plying junction exceeds that in the run of strand 28 approaching the plying junction, so that strand 30 tends to become the core of the plied strand and strand 28 tends to wrap around such core, so that strand 28 is absorbed into the plied strand at a faster rate than is strand 30. This, if uncorrected, would still further decrease the diameter of the balloon.

The described loosening of clutch 124 by mechanism 41, however, allows the strand 30 momentarily to run past capstan 40 at a higher speed than the capstan would normally be driven by shaft 102, so that the tension in the run of strand 30 approaching the plying junction is decreased. Such decrease in tension in strand 30 allows more of strand 30 to be absorbed in the plied strand 33, so the rate of absorption of strand 28 into plied strand 33 decreases. As a result, the rate of withdrawal of strand 28 from the balloon decreases, and the balloon gradually grows in diameter. When such diameter has increased sufficiently, balloon B no longer contacts rim 127 of disc 42 with sufficient force to overcome spring 115, lever 120 descends, and the clutch 124 eventually becomes fully engaged to drive capstan 40 at the speed of shaft 102.

In the main the balloon B will remain of such diameter that strand 28 runs between rims 56 and 127 of bell 50 and disc 42, respectively, without contacting them, or, at most, contacting them so lightly that the balloon does not operate the respective capstan speed-varying means 47, 49 and 124. The apparatus of the invention operates in the manner described to correct a condition of either undue balloon expansion or contraction, but immediately returns the particular capstan whose speed had been varied to a constant speed when the balloon has been returned to its optimum working diameter range. The apparatus is thus particularly stable and trouble free in its operation.

In Fig. 5 there is shown a second embodiment of the apparatus of the invention. In such second embodiment both the outer and inner capstans are idle or undriven, being normally retarded so as to impose a substantially constant retarding tension on the respective strands approaching the plying junction when the balloon has a diameter lying within the desired operating range. When the balloon either expands or contracts unduly, however, the outer and inner capstans, respectively, are operated to alter their strand-retarding effects in such manner as to correct the deviation in size of the balloon. At other times the retarding effects of the respective capstans are not varied, and, in the embodiment shown, the balloon rotates substantially freely in space.

In Fig. 5 there is shown a strand plying spindle generally of the same type as that disclosed in Fig. 8 of applicant's prior application Ser. No. 541,222. In Fig. 5 there is shown a spindle, generally designated 160, having a main rotatably mounted shaft 161 with a disc-like flyer 169 mounted thereon. A first strand 166, supplied by an outer package 162, is fed therefrom by a frictionally retarded capstan 47' downwardly through a fixed eye 165 into a balloon 167 created and maintained by the flyer 169. Centrally within the flyer, strand 166 meets strand 172 fed from inner package 170 downwardly through a central axial bore in upper extension 171 of shaft 161. Extension 171 is mounted in bearings on shaft 161 above the flyer, as shown, and may be held from rotation by using an eccentrically weighted platform on extension 171, also as shown, and by tipping the spindle axis from the vertical. Alternatively or additionally, as set forth in connection with the first-described embodiment, extension 171 may be held from rotation by magnet means (not shown). The resulting plied strand 184 is pulled from the spindle by a driven capstan 185 which engages it in a substantially non-slipping manner and forwards it to a frictionally driven take-up bobbin generally designated 186. Capstan 185 is driven by means not shown at constant speed in synchronism with spindle 161. Consequently the plied strand has a substantially constant number of twists per unit length.

Within the shaft extension portion 171 of the spindle there is located an idle strand-engaging capstan means 174 having a brake drum 173 thereon variably engaged by a brake shoe 175. The brake shoe is engaged and pressed downwardly by the adjustable threaded spindle 176 through the medium of an interposed coil spring, as shown. Spindle 176 is mounted in a lateral arm 177 on the bottom of a vertically reciprocable sleeve 179. A second lateral arm 130 carries an adjusting stud 131 screwed thereinto, the stud forming, with the top of spindle portion 171, a stop for disc 180. The sleeve 179, its manner of mounting, and the balloon-contacting means controlling it are similar to those shown in Fig. 8 of application Ser. No. 541,222. The balloon-contacting means 183' has a central shaft 181 carrying at the top thereof and coaxial therewith a disc 180 the outer edge of which contacts the balloon 167. The lower end (not shown) of shaft 181 has threaded engagement with spindle 179, the hand of the threads being such that rotation of shaft 181 in the direction of rotation of the balloon raises the spindle 179. Rotation of the shaft 181 in the direction of rotation of the balloon is opposed by a coil spring 182. The structure 183' is mounted on an over-arm device consisting of lower arms 32' attached to a package-supporting platform on extension 171, and upper arms 34' and 35' pivotally connected thereto. The main upper arm portion 34', carrying device 183', is latched to bracing arm 35' by means 37'.

Capstan 47' has the same construction as capstan 47 of the first described embodiment except that, since capstan 47' is frictionally retarded at all times, driving shafts 57 and 60, clutch 59, and bevel gear set 61 are omitted. Capstan 47' is under the control of mechanism 49', which may be substantially identical with mechanism 49 of the first embodiment. The parts of capstan 47' and mechanism 49' are designated by the same reference characters as are those of capstan 47 and mechanism 49.

In the apparatus of Fig. 5, stud 94 is so adjusted that brake shoe 99 is constantly urged against brake drum 101. Stud 94, and spindle 176 and adjusting stud 131 associated with capstan 174, are adjusted to impose equal tensions of desired value on the runs of strands 166 and 172, respectively, approaching the plying point P under average operating conditions. Under such conditions, the balloon 167 will have a diameter within the desired operating range, and the strand 166 in the balloon will rotate freely in space between the rims of the bell 50 and the disc 180.

When the balloon 167 expands unduly, thereby causing the strand 166 to be under a higher tension as it approaches the plying point P than is strand 172, the balloon will contact the rim of bell 50 with sufficient force to rotate the bell in the direction of rotation of the balloon against the opposition of spring 76 and therefore to raise element 82. Brake shoe 99 is thus thrust more forcibly against the brake drum 101, and capstan 47' feeds strand 166 more slowly into balloon 167. As the balloon contracts toward the desired operating range, the strand 166 therein gradually presses against the rim of bell 50 less and less forcibly, so that brake shoe 99 retards the capstan 47' to a progressively lesser degree. This continues until the balloon once more lies in its desired balloon diameter range. During the time that means 47', 49', and 50 correct an undue expansion of the balloon, of course, capstan 174 has continued to retard strand 172 with a substantially constant force.

When the balloon contracts unduly, thereby causing the strand 166 to be under a lower tension as it approaches the plying point P than is strand 172, the balloon will contact the rim of disc 180 with sufficient force to rotate the disc in the direction of rotation of the balloon against the opposition of spring 182 and therefore to raise spindle 179. Brake shoe 175 is thus thrust less forcibly against the brake drum 173, and capstan 174 feeds strand 172 toward the plying point P at a higher speed. This reduces the tension in strand 172, equalizes the tension in strands 166 and 172, and causes strand 172 to be absorbed into plied strand 184 at an increased rate and causes strand 166 to be absorbed into plied strand 184 at a decreased rate, thereby correcting the condition which caused the undue contraction of balloon 167. When the balloon has expanded sufficiently to lie once more in its desired operating range, it ceases to contact the rim of disc 180 with sufficient force to overcome spring 182, and the spring rotates shaft 181 to thrust spindle 179 downwardly until the spindle is stopped by stud 131.

It will be understood that the devices shown in the described illustrated embodiments are capable of considerable variation within the teaching of the invention. Thus, for example, further embodiments of the plying apparatus of the invention may be made to incorporate features of both the embodiments of (1) Figs. 1–4, inclusive, and (2) Fig. 5 herein.

One such further embodiment has means for feeding the outer strand into the balloon identical with that shown in Figs. 1–4, inclusive, wherein the capstan is normally driven at a constant speed, and an idle capstan for feeding the inner strand identical with that shown in Fig. 5, the capstans being under the control of bell 50 and an inner balloon-contacting disc, respectively, as shown. In this embodiment the take-up means for the plied strand is the same as that shown in Fig. 5, wherein the plied strand is pulled from the spindle by a constant speed capstan driven in synchronism with the spindle, and is then taken up on a frictionally driven bobbin.

Another one of such further embodiments has means for feeding the outer strand into the balloon identical with that shown in Fig. 5, wherein the outer capstan is idle and braked, and a capstan normally driven at a constant speed for feeding the inner strand identical with that shown in Figs. 1–4, inclusive, the capstans being under the control of bell 50 and an inner balloon-contacting disc, respectively, as shown. In the embodiment described in the instant paragraph there may be employed a take-up mechanism for the plied strand similar to that shown diagrammatically at 38 and 43 in Fig. 1.

Also, although in all the above disclosed embodiments of the invention the outer and inner mechanisms for detecting changes in balloon diameter have used spring opposed rotatable balloon contacting members for so doing, it will be understood that within the scope of the invention other mechanisms may be employed for these purposes. Thus, either the outer or inner balloon diameter detecting means, or both, may be, for example, any of the mechanisms for that purpose disclosed and claimed in my Patents Nos. 2,725,711; 2,726,506; 2,728,185; and applications Serial No. 214,866; filed March 10, 1951; Serial No. 261,704, filed December 14, 1951; and Serial No. 317,406, filed October 29, 1952.

Further, within the scope of the invention, and particularly when the strand within the spindle is the same as that in the balloon created by the spindle, as in two-for-one uptwisters and downtwisters, the outer and inner balloon diameter detecting means may be physically interconnected. Thus, the outer and inner balloon diameter detecting means may be mechanically interconnected. Such electrical interconnection may be, for example, by way of slip rings on the flyer cooperating with brushes whereby to establish a control circuit extending from outside the balloon to within the balloon. The magnetic interconnection may be, for example, by way of cooperating rotatable magnet devices one of which is positioned outside the balloon and the other of which is positioned inside the balloon, the balloon extending between such devices, in the manner shown in my pending application Serial No. 608,137, filed September 5, 1956. In the construction described in the present paragraph, the outer and inner balloon diameter detecting means will both be connected to the same strand tensioning means, such as a strand retarding or take-up device, so that the tension imposed thereby on the strand is increased when the balloon diameter becomes too large, and so that the tension imposed thereby on the strand is decreased when the balloon diameter is decreased when the balloon diameter becomes too small.

The invention is therefore to be defined by the scope of the claims appended hereto.

I claim:

1. In strand-twisting apparatus, in combination, mechanism for rotating a strand in the form of a balloon and for pulling the strand forward, means outside the balloon and operated thereby when the balloon reaches a predetermined first, larger diameter, means inside the balloon and operated thereby when the balloon reaches a predetermined second, smaller diameter, and means responsive to the two last recited means for controlling the size of the balloon.

2. In strand-twisting apparatus, in combination, mechanism for rotating a strand in the form of a balloon and for pulling the strand forward, means outside the balloon and operated thereby when the balloon reaches a predetermined first, larger diameter, means inside the balloon and operated thereby when the balloon reaches a predetermined second, smaller diameter, and means responsive to the two last recited means for controlling the size of the balloon to maintain its diameter within predetermined limits.

3. In strand-twisting apparatus, in combination, mechanism for rotating a strand in the form of a balloon and for pulling the strand forward, means outside the balloon and operated thereby only when the balloon reaches a predetermined first, larger diameter, means inside the balloon and operated thereby only when the balloon reaches a predetermined second, smaller diameter, and means responsive to the two last recited means for controlling the size of the balloon substantially between the limits defined by said first and second diameters.

4. In strand-twisting apparatus, in combination, mechanism for rotating a strand in the form of a balloon and for pulling the strand forward, means outside the balloon and contacted thereby when the balloon reaches a predetermined first, larger diameter, means inside the balloon and contacted thereby when the balloon reaches a predetermined second, smaller diameter, and means responsive to the two last recited means for controlling the size of the balloon.

5. In strand-twisting apparatus, in combination, mechanism for rotating a strand in the form of a balloon and for pulling the strand forward, means outside the balloon and operated thereby only when the balloon reaches a predetermined first, larger diameter, means inside the balloon and operated thereby only when the balloon reaches a predetermined second, smaller diameter, and means responsive to the two last recited means and operated only by such two last recited means for controlling the size of the balloon to maintain its diameter within predetermined limits.

6. In strand-twisting apparatus, in combination, mechanism for rotating a strand in the form of a balloon and for pulling the strand forward, annular means outside and coaxial of the balloon and operated thereby only when the balloon reaches a predetermined first, larger diameter, a second, circular means inside and coaxial of the balloon and spaced from the first, annular means to present an annular balloon receiving space between them, the second, circular means being operated by the balloon only when the balloon reaches a predetermined second, smaller diameter, and means responsive to the last two recited means for controlling the size of the balloon to maintain its diameter within predetermined limits.

7. In strand-twisting apparatus, in combination, mechanism for rotating a strand in the form of a balloon and for pulling the strand forward, annular rotatable means outside and coaxial of the balloon and operated thereby only when the balloon reaches a predetermined first, larger diameter, circular rotatable means inside and coaxial of the balloon and operated thereby only when the balloon reaches a predetermined second, smaller diameter, and means responsive to the two last recited means for controlling the size of the balloon to maintain its diameter within predetermined limits.

8. In strand-twisting apparatus, in combination, mechanism for rotating a strand in the form of a balloon and for pulling the strand forward, annular rotatable means outside and coaxial of the balloon and rotated thereby only when the balloon reaches a predetermined first, larger diameter, resilient means opposing rotation of the annular means by the balloon, circular rotatable means inside and coaxial of the balloon and rotated thereby only when the balloon reaches a predetermined second, smaller diameter, resilient means opposing rotation of the circular means by the balloon, and means responsive to the two rotatable means for controlling the size of the balloon to maintain its diameter within predetermined limits.

9. Mechanism for twisting together two strands, comprising a source of supply of a first strand and a support carrying a let-off strand package for a second strand, a rotatable shaft operable to rotate a balloon of the first strand about the let-off package and also to ply the two strands together at a plying junction, a first means for feeding the first strand into the balloon, means outside the balloon and operated thereby when the balloon reaches a predetermined, first diameter for controlling the first feeding means, a second means for feeding the second strand to the plying junction, and means inside the balloon and operated thereby when the balloon reaches a predetermined second, smaller diameter for controlling the second feeding means.

10. Mechanism for twisting together two strands, comprising a source of supply of a first strand and a support carrying a let-off strand package for a second strand, a rotatable shaft operable to rotate a balloon of the first strand about the let-off package and also to ply the two strands together at a plying junction, a first, variable speed means for feeding the first strand into the balloon, means outside the balloon and operated thereby when the balloon reaches a predetermined, first diameter for controlling the first feeding means, a second variable speed means for feeding the second strand to the plying junction, and means inside the balloon and operated thereby when the balloon reaches a predetermined second, smaller diameter for controlling the second feeding means, whereby the diameter of the balloon is maintained within predetermined limits.

11. Mechanism for twisting together two strands, comprising a source of supply of a first strand and a support carrying a let-off strand package for a second strand, a rotatable shaft operable to rotate a balloon of the first strand about the let-off package and also to ply the two strands together at a plying junction, a first, variable speed means for feeding the first strand into the balloon, means outside the balloon and contacted thereby only when the balloon reaches a predetermined, first diameter for controlling the first feeding means, a second variable speed means for feeding the second strand to the plying junction, and means inside the balloon and contacted thereby only when the balloon reaches a predetermined second, smaller diameter for controlling the second feeding means, whereby the diameter of the balloon is maintained within predetermined limits.

12. Mechanism for twisting together two strands, comprising a source of supply of a first strand and a support carrying a let-off strand package for a second strand, a rotatable shaft operable to rotate a balloon of the first strand about the let-off package and also to ply the two strands together at a plying junction, a first, variable speed means for feeding the first strand into the balloon, means outside the balloon and operated thereby only when the balloon reaches a predetermined, first diameter for decreasing the speed of the first feeding means, a second variable speed means for feeding the second strand to the plying junction, and means inside the balloon and operated thereby only when the balloon reaches a predetermined second, smaller diameter for increasing the speed of the second feeding means, whereby the diameter of the balloon is maintained within predetermined limits.

13. Mechanism for twisting together two strands, comprising a source of supply of a first strand and a support carrying a let-off strand package for a second strand, a rotatable shaft operable to rotate a balloon of the first strand about the let-off package and also to ply the two strands together at a plying junction, a first means for feeding the first strand into the balloon, means for normally driving the first feeding means at constant speed, means outside the balloon and operated thereby only when the balloon reaches a predetermined, first diameter for decreasing the speed of the first feeding means, a second means for feeding the second strand to the plying junction, means for normally driving the second feeding means at constant speed, and means inside the balloon and operated thereby only when the balloon reaches a predetermined second, smaller diameter for increasing the speed of the second feeding means, whereby the diameter of the balloon is maintained within predetermined limits.

14. Mechanism for twisting together two strands, comprising a source of supply of a first strand and a support carrying a let-off strand package for a second strand, a rotatable shaft operable to rotate a balloon of the first strand about the let-off package and also to ply the two strands together at a plying junction, a first frictionally retarded variable speed means for feeding the first strand into the balloon, means outside the balloon and operated thereby only when the balloon reaches a predetermined, first diameter for decreasing the speed of the first feeding means, a second frictionally retarded variable speed means for feeding the second strand to the plying junction, and means inside the balloon and operated thereby only when the balloon reaches a predetermined second, smaller diameter for increasing the speed of the second feeding means, whereby the diameter of the balloon is maintained within predetermined limits.

15. Apparatus for handling elongated flexible material advancing under tension through a zone in which it forms a rotating bulging free-lying loop, comprising means outside the loop and operated thereby when the loop reaches a predetermined first, larger diameter, means inside the loop and operated thereby when the loop reaches a predetermined second, smaller diameter, and means responsive to the two last recited means for controlling the size of the loop.

16. Apparatus for handling elongated flexible material advancing under tension through a zone in which it forms a rotating bulging free-flying loop, comprising means outside the loop and contacted thereby when the loop reaches a predetermined first, larger diameter, means inside the loop and contacted thereby when the loop reaches a predetermined second, smaller diameter, and means responsive to the two last recited means for controlling the size of the loop.

17. In apparatus for handling elongated flexible material advancing under tension through a zone in which it forms a rotating bulging free-flying loop and having means for rotating the loop, means for pulling the material forward, and means for subjecting the material in the loop to tension, the improvement which comprises means outside the loop and operated thereby when the loop reaches a predetermined first, larger diameter, means inside the loop and operated thereby when the loop reaches a predetermined second, smaller diameter, and means responsive to the two last recited means for controlling the size of the loop.

18. In apparatus for handling elongated flexible material advancing under tension through a zone in which it forms a rotating bulging free-flying loop and having means for rotating the loop, means for pulling the material forward, and means for subjecting the material in the loop to tension, the improvement which comprises means outside the loop and contacted thereby only when the loop reaches a predetermined first, larger diameter, means inside the loop and contacted thereby only when the loop reaches a predetermined second, smaller diameter, and means responsive to the two last recited means for controlling the size of the loop.

19. Apparatus for handling elongated flexible material advancing under tension through a zone in which it forms a rotating bulging free-flying loop, comprising means contacted and moved by the loop only when the diameter of the loop in changing in a given sense reaches a predetermined diameter, means for exerting substantially a constant tension on the loop when the loop-contacting means is not contacted by the loop, and means operatively connecting the last named means to the loop-contacting means so as to change the diameter of the loop in the opposite sense.

20. Apparatus for handling elongated flexible material advancing under tension through a zone in which it forms a rotating bulging free-flying loop, comprising means outside the loop and contacted and moved thereby only when the diameter of the loop increases to a predetermined value, means for exerting substantially a constant tension on the loop when the loop-contacting means is not contacted by the loop, and means operatively connecting the last named means to the loop-contacting means so as to vary the tension exerted on the loop when the loop contacts the loop-contacting means so as to decrease the diameter of the loop.

21. Apparatus for handling elongated flexible material advancing under tension through a zone in which it forms a rotating bulging free-flying loop, comprising means inside the loop and contacted and moved thereby only when the diameter of the loop decreases to a predetermined value, means for exerting substantially a constant tension on the loop when the loop-contacting means is not contacted by the loop, and means operatively connecting the last named means to the loop-contacting means so as to vary the tension exerted on the loop when the loop contacts the loop-contacting means so as to increase the diameter of the loop.

22. Mechanism for twisting together two strands, comprising a source of supply of a first strand and a support carrying a let-off strand package for a second strand, a rotatable shaft operable to rotate a balloon of the first strand about the let-off package and also to ply the two strands together at a plying junction, a first, variable speed means for feeding the first strand into the balloon, means outside the balloon and operated thereby when the balloon reaches a predetermined, first diameter for controlling the first feeding means, a second variable speed means for feeding the second strand to the plying junction, means inside the balloon and operated thereby when the balloon reaches a predetermined second, smaller diameter for controlling the second feeding means, whereby the diameter of the balloon is maintained within predetermined limits, and means for pulling the plied strand away from the plying junction at constant speed.

23. Mechanism for twisting together two strands, comprising a source of supply of a first strand and a support carrying a let-off strand package for a second strand, a rotatable shaft operable to rotate a balloon of the first strand about the let-off package and also to ply the two strands together at a plying junction, a first, variable speed means for feeding the first strand into the balloon, means outside the balloon and contacted thereby only when the balloon reaches a predetermined, first diameter for controlling the first feeding means, a second variable speed means for feeding the second strand to the plying junction, means inside the balloon and contacted thereby only when the balloon reaches a predetermined second, smaller diameter for controlling the second feeding means, whereby the diameter of the balloon is maintained within predetermined limits, and means for pulling the plied strand away from the plying junction at constant speed.

24. Mechanism for twisting together two strands, comprising a source of supply of a first strand and a support carrying a let-off strand package for a second strand, a rotatable shaft operable to rotate a balloon of the first strand about the let-off package and also to ply the two strands together at a plying junction, a first, variable speed means for feeding the first strand into the balloon, means outside the balloon and operated thereby only when the balloon reaches a predetermined, first diameter for decreasing the speed of the first feeding means, a second variable speed means for feeding the second strand to the plying junction, means inside the balloon and operated thereby only when the balloon reaches a predetermined second, smaller diameter for increasing the speed of the second feeding means, whereby the diameter of the balloon is maintained within predetermined limits, and means for pulling the plied strand away from the plying junction at constant speed.

25. Mechanism for twisting together two strands, comprising a source of supply of a first strand and a support carrying a let-off strand package for a second strand, a rotatable shaft operable to rotate a balloon of the first strand about the let-off package and also to ply the two strands together at a plying junction, a first frictionally retarded variable speed means for feeding the first strand into the balloon, means outside the balloon and operated thereby only when the balloon reaches a predetermined, first diameter for decreasing the speed of the first feeding means, a second frictionally retarded variable speed means for feeding the second strand to the plying junction, means inside the balloon and operated thereby only when the balloon reaches a predetermined second, smaller diameter for increasing the speed of the second feeding means, whereby the diameter of the balloon is maintained within predetermined limits, and means for pulling the plied strand away from the plying junction at constant speed.

References Cited in the file of this patent

UNITED STATES PATENTS

| | | |
|---|---|---|
| 2,689,449 | Clarkson | Sept. 21, 1954 |
| 2,736,160 | Vibber | Feb. 28, 1956 |